No. 879,075. PATENTED FEB. 11, 1908.
E. J. WHEELER.
COMBINED AUGER HEAD AND REAMER.
APPLICATION FILED SEPT. 5, 1907.
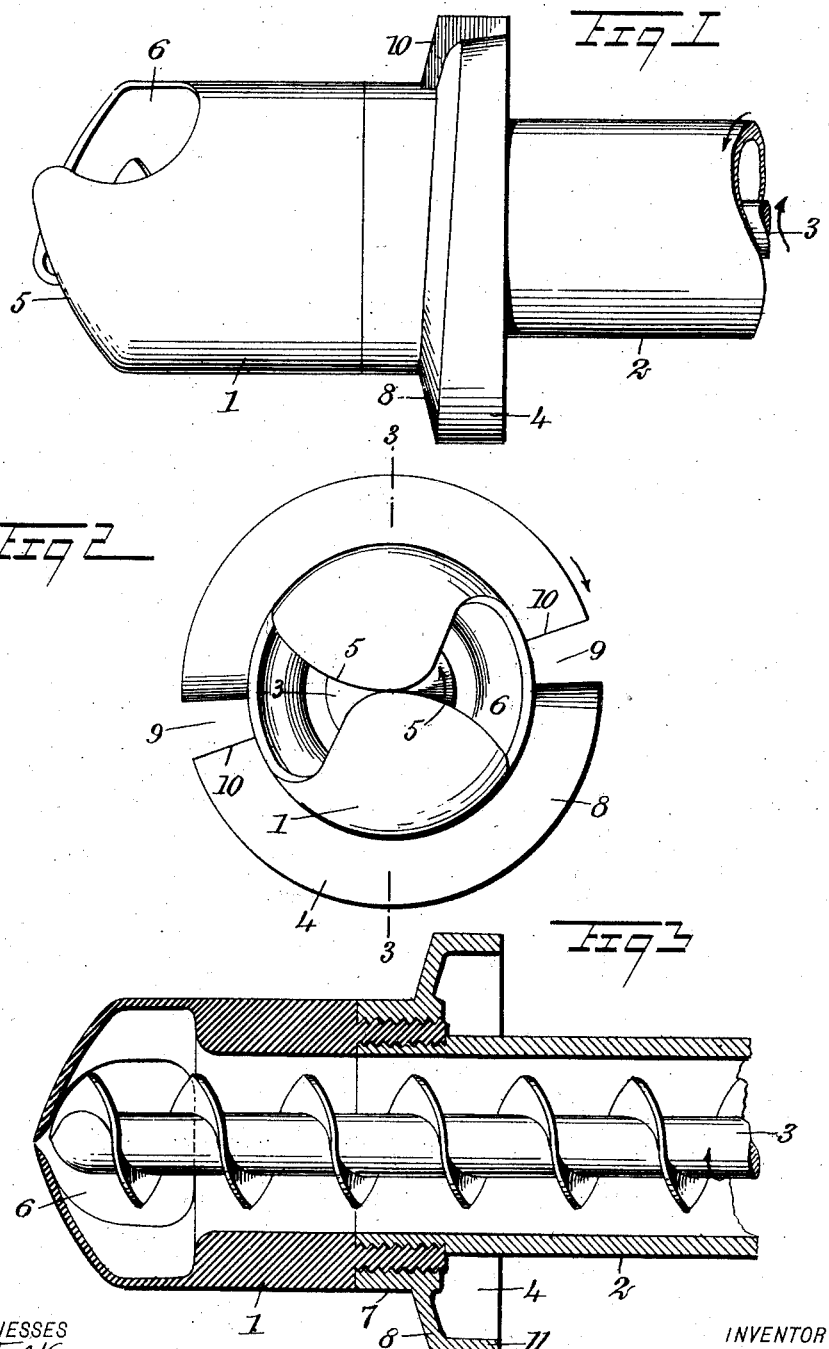
WITNESSES
H. Walker
C. W. Fairbank
INVENTOR
Eugene J. Wheeler
BY
ATTORNEYS

UNITED STATES PATENT OFFICE.

EUGENE J. WHEELER, OF BRYSON CITY, NORTH CAROLINA.

COMBINED AUGER-HEAD AND REAMER.

No. 879,075.          Specification of Letters Patent.          Patented Feb. 11, 1908.

Application filed September 5, 1907. Serial No. 391,504.

*To all whom it may concern:*

Be it known that I, EUGENE J. WHEELER, a citizen of the United States, and a resident of Bryson City, in the county of Swain and State of North Carolina, have invented a new and Improved Combined Auger-Head and Reamer, of which the following is a full, clear, and exact description.

This invention relates to a combined tool adapted to bore a much larger hole in wood or other similar material than is possible with the tool now commonly employed.

Reference is to be had to the accompanying drawings, which form part of this specification, in which drawings like characters of reference indicate like parts throughout the views, and in which Figure 1 is a side elevation of my improved tool; Fig. 2 is an end elevation thereof; and Fig. 3 is a longitudinal section on the line 3—3 of Fig. 2.

The tool is composed primarily of four parts, namely, the augerhead 1, a hollow barrel 2, the chip removing worm 3 and the reamer 4. The augerhead 1 is hollow and cylindrical and provided at its ends with the usual cutting surfaces 5 and chip inlet openings 6, whereby the chips formed by the cutting edges 5 may pass into the interior of the head. To convey these chips away from the point at which the work is being done, I provide a worm or screw conveyer operating within the head and rotating in the opposite direction from that of the head by means of any suitable mechanism not shown. The barrel 2 is screw-threaded into the outer end of the augerhead 1 so as to leave a smooth interior passage for the chips, while the reamer 4 is screw-threaded to the outer surface of the augerhead, and having its cylindrical surface 7 flush with the outer surface of the augerhead. The reamer is provided with an outwardly diverging wall 8 having one or more openings 9 therethrough, each adjacent a cutting edge 10, while the outer edge of the diverging wall 8 is provided with a cylindrical guiding portion 11. It is evident that any number of reamers of varying sizes may be provided for one augerhead and used interchangeably therewith.

In the operation of the device, a reamer is employed having an outer diameter equal to the diameter of the hole which it is desired to produce. The augerhead forms an opening considerably smaller than that desired to be produced, and the chips formed by the cutting edges 5 are conveyed out through the barrel by the worm 3. When the small opening has attained a depth equal to the length of the augerhead, the reamer contacts with the wood or other material being operated upon and the chips formed by the cutting edges 10 are delivered outside of the barrel 2. By the employment of the improved device above described it is possible to bore a very large hole at one operation, thus saving a second handling.

Having thus described my invention, what I claim as new and desire to secure by Letters Patent is:

1. In combination, a hollow auger head having a cylindrical body portion and having a cutting edge and openings into the interior thereof and at one end thereof, whereby the material removed by said cutting edge passes to the interior of said head, said auger head having the end thereof opposite to said cutting edge of reduced diameter and exteriorly and interiorly threaded, a reamer having a cylindrical portion threaded to said reduced portion of the auger head and with its outer surface flush with the outer surface of said head, said reamer presenting a cutting edge extending outwardly from said surface, a barrel threaded into the outer end of said head and having the interior surface thereof flush with the interior surface of said head, and a worm extending through said barrel and terminating in said head adjacent said cutting edge and rotatable independently of said head.

2. In combination, a hollow auger head having a cylindrical body portion and having a cutting edge and openings into the interior thereof and at one end thereof, whereby the material removed by said cutting edge passes to the interior of said head, said auger head having the end thereof opposite to said cutting edge of reduced diameter and exteriorly and interiorly threaded, a reamer having a cylindrical portion threaded to said reduced portion of the auger head and with its outer surface flush with the outer surface of said head, said reamer presenting a cutting edge extending outwardly from said surface, and a barrel threaded into the outer end of said head and having the interior surface thereof flush with the interior surface of said head.

In testimony whereof I have signed my name to this specification in the presence of two subscribing witnesses.

EUGENE J. WHEELER.

Witnesses:
R. L. DAVIS,
GEO. B. WHEELER.